US005889209A

United States Patent [19]

Piedrahita et al.

[11] Patent Number: 5,889,209

[45] Date of Patent: Mar. 30, 1999

[54] METHOD AND APPARATUS FOR PREVENTING BIOFOULING OF AQUATIC SENSORS

[75] Inventors: Raul H. Piedrahita; Kevin B.H. Wong, both of Davis, Calif.

[73] Assignee: The Regents of the University of California, Oakland, Calif.

[21] Appl. No.: 993,802

[22] Filed: Dec. 18, 1997

[51] Int. Cl.[6] .................................................... G01H 17/00

[52] U.S. Cl. ............................ 73/570; 367/157; 367/147; 340/12 R

[58] Field of Search ............................... 73/570; 210/748; 340/9; 134/1; 367/157, 147, 173

[56] References Cited

U.S. PATENT DOCUMENTS

| | | | |
|---|---|---|---|
| 2,585,103 | 2/1952 | Fitzgerald | 210/748 |
| 3,429,743 | 2/1969 | Branson | 134/748 |
| 3,489,679 | 1/1970 | Davidson et al. | 210/748 |
| 3,672,823 | 6/1972 | Boucher | 21/54 R |
| 3,708,263 | 1/1973 | Boucher | 21/54 A |
| 3,803,547 | 4/1974 | Massa | 340/9 |
| 4,444,146 | 4/1984 | De Witz et al. | 134/1 |
| 4,716,829 | 1/1988 | Wenzel | 134/1 |
| 4,782,470 | 11/1988 | Poturnicki, Jr. et al. | 367/157 |
| 5,088,068 | 2/1992 | Schaill et al. | 367/173 |
| 5,636,180 | 6/1997 | Grothaus et al. | 367/147 |

OTHER PUBLICATIONS

Latour et al., "Application of PVF2 Transducers as Piezoelectric Vibrators for Marine Fouling Prevention", Ferroelectrics, vol. 32, pp. 33–37, 1981.

Schaule et al., "Ultrasound as a Means of Detaching Biofilms", Biofouling, vol. 2, pp. 323–333, 1990.

A. Zips et al; "Ultrasonic as a Means of Detaching Biofilms"; Biofouling, 1990. vol. 2, pp. 323–333.

Latour; "Application of PVF2 Transducers as Piezoelectric Vibrators for Marine Fouling Prevention" Ferroelectric, 1981, vol. 32 pp. 33–37.

*Primary Examiner*—Hezron Williams
*Assistant Examiner*—Thuy Vinh Tran
*Attorney, Agent, or Firm*—John P. O'Banion

[57] ABSTRACT

A submersible ultrasonic emitter is integrated with a dissolved oxygen (DO) or other aquatic probe so that biofouling of the sensor's membrane is minimized. Sonification, that is, exposure to ultrasound, precludes the need to use other biofouling elimination procedures such as water/air jets, chemical treatments, or biocides. The invention can be configured to readily integrate with existing probes from a variety of manufacturers, and eliminates membrane cleaning as the maintenance interval constraint for field or laboratory deployed sensors.

8 Claims, 4 Drawing Sheets

METHOD AND APPARATUS FOR PREVENTING BIOFOULING OF AQUATIC SENSORS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

This invention pertains generally to aquatic sensors, and more particularly to a sonification method and apparatus for preventing biofouling of dissolved oxygen and other aquatic sensors.

2. Description of the Background Art

Dissolved oxygen and other electrochemical sensors are commonly used to detect the presence of substances such as dissolved gases and ions in water. Typically, these sensors have one or more electrodes immersed in an electrolyte solution and are covered by a membrane that is permeable to a substance of interest. To measure the concentration of a substance of interest, the sensor is submerged in the solution to be analyzed and, as the substance of interest diffuses through the membrane, it causes a chemical reaction between the electrolyte solution and the electrode. This reaction generates an electrical signal that is detected by a meter, and is indicative of the concentration or activity of the substance of interest. For dissolved oxygen (DO) sensors, the electrolyte is usually replaced on the order of every two to four weeks. However, if the sensor is submerged in a biologically active water (e.g., lakes, rivers, wastewater treatment plants), biofouling organisms can start adhering to the membrane surface in a matter of hours. Over a time period of much less than two weeks, the biofilm that develops on the membrane surface will adversely affect the sensor accuracy.

In response to this problem, various approaches to eliminating or controlling biofouling on the surface of aquatic sensors have been developed. These approaches typically fall into the following four categories:

(a) Electrochemical cleaning. In this approach a timed reaction releases biostatic or biocidal chemicals in the vicinity of the membrane surface.

(b) Mechanical cleaning. This approach is usually characterized by vigorous vibration or agitation of the sensor and/or contact abrasion by suspended particles or a wiping device.

(c) Hydraulic cleaning. Here, timed jets of water or chemical solutions bathe the sensor surface, washing and dislodging any attached fouling.

(d) Software compensation. Here, a quantitative model of sensor attenuation due to the biofouling layer is obtained. The probe signal is then adjusted by this amount to compensate for the biofouling.

In practice, a person designing cleaning systems for sensors used in sensitive aquatic systems must avoid the use of harsh chemical treatments, harmful biocides, and the alteration of temperature, pH, or the concentration of the substance of interest in the water being tested. Current mechanical and hydraulic cleaning systems add a level of unnecessary complexity to the sensor and are fraught with problems of their own, such as fouling of the nozzles and the need for additional pumping systems and motorized parts. Furthermore, accurate software compensation is extremely problematic due to the difficulty in developing an accurate and robust model of biofilm growth.

BRIEF SUMMARY OF THE INVENTION

This invention pertains generally to a method and apparatus for minimizing or eliminating biofouling of aquatic sensors, including dissolved oxygen (DO) sensors. In general terms, the present invention comprises a submersible ultrasonic emitter integrated with an aquatic sensor. Pressure waves from the ultrasonic emitter cause vigorous localized water agitation. This results in particles being dislodged from the sensor. Perhaps more important than the cleaning ability of ultrasonic energy, is its ability to inhibit or prevent substantial microbial growth on the target surface in the first place.

By way of example, and not of limitation, the ultrasonic emitter comprises a piezoelectric material that undergoes contraction and expansion when subjected to a voltage source having an alternating polarity. Ultrasonic pressure waves in the frequency range of approximately 10 KHz to 100 KHz are generated in a liquid medium by the rapid contraction and expansion of the piezoelectric material. These pressure waves cause the formation and subsequent implosion of small gas bubbles in the liquid which creates vigorous localized liquid agitation which dislodges particles from the surface of the sensor. These pressure waves also help to push the boundary layer closer to the probe surface, thus increasing the efficiency of diffusion and advective cleaning by rapidly bringing "fresh" solution into close proximity of the dirty surface and transporting detached material away from the vicinity of the probe surface.

It will be appreciated that removing attached microbiological growth is more difficult than preventing the growth in the first place. Accordingly, an important aspect of the present invention is its ability to function as a means to inhibit biofouling; sonification of a "clean" surface at regular intervals in accordance with the present invention acts to discourage attached growth.

An object of the invention is to prevent the development of a biofilm on the surface of a sensor (or other measuring device) deployed in a microbiologically active aquatic environment.

Another object of the invention is to clean or remove the attached organisms and other deposits that occur when a sensor (or other measuring device) is deployed in a microbiologically active aquatic environment.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only, where like reference numerals denote like parts.

DETAILED DESCRIPTION OF THE INVENTION

Figure 3:
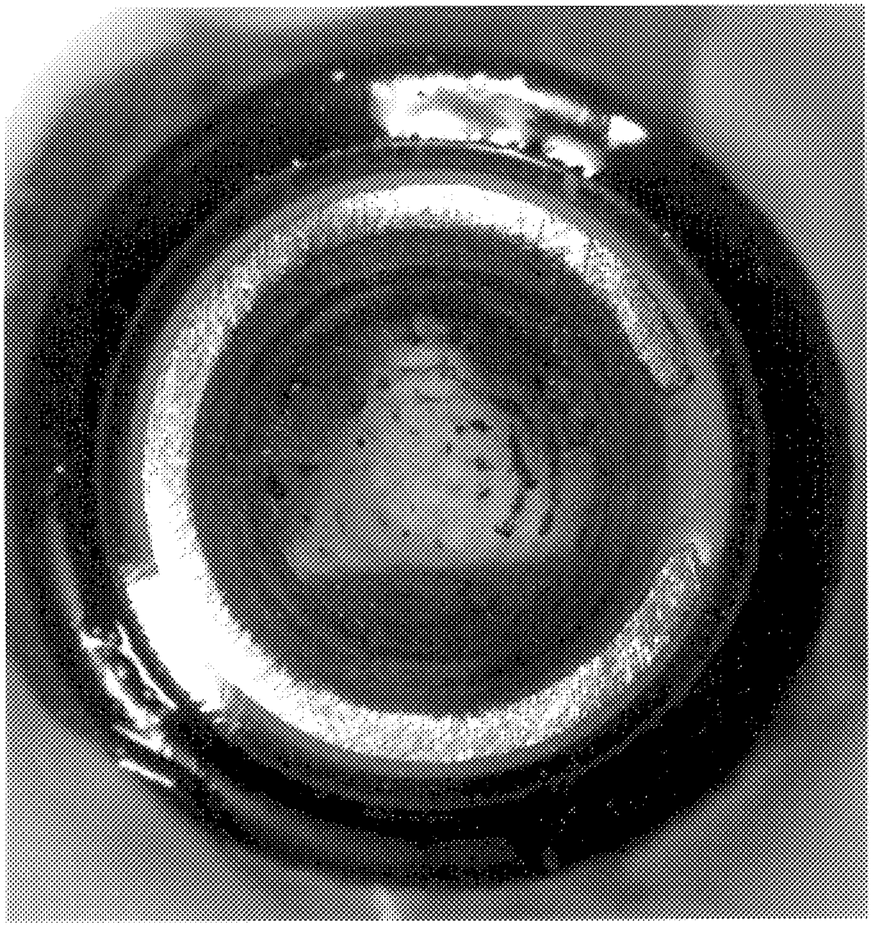
FIG. 3 is a photograph of the oxygen permeable membrane of a dissolved oxygen probe after seven days of exposure in microbiologically active water and ultrasonification in accordance with the present invention.
Figure 4:
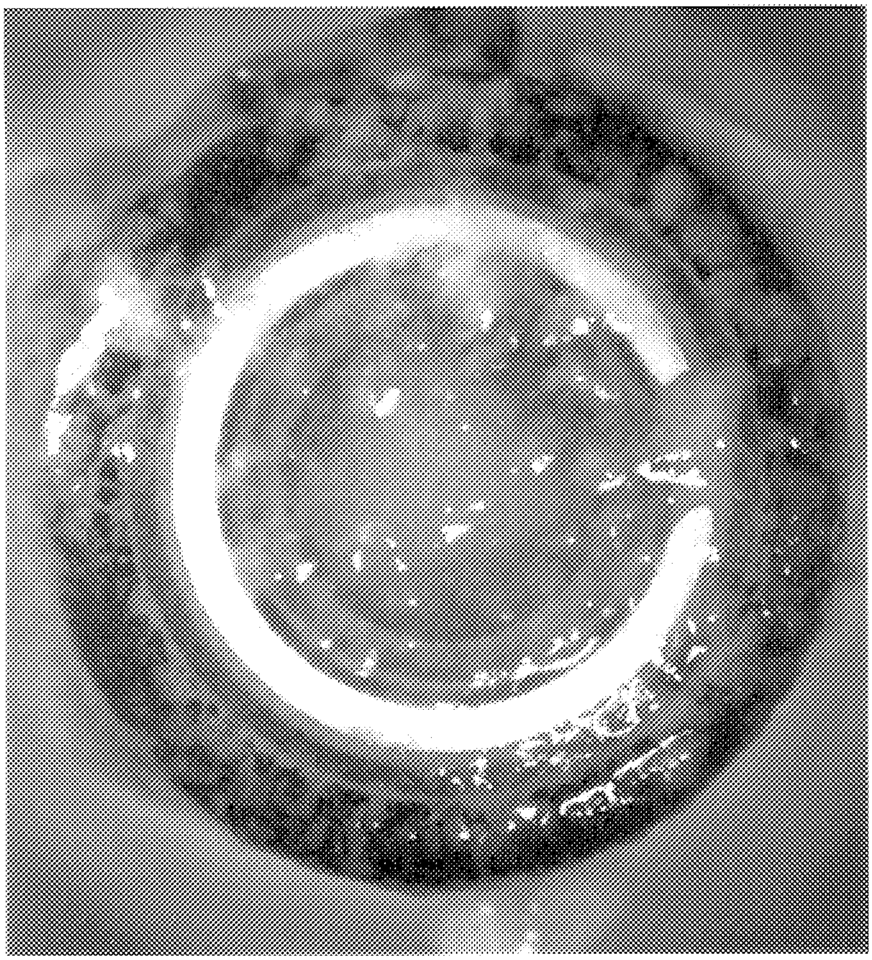
FIG. 4 is a photograph of the oxygen permeable membrane of a dissolved oxygen probe identical to the probe shown in FIG. 3 after seven days of exposure in microbiologically active water without ultrasonification in accordance with the present invention.

Referring more specifically to the drawings, for illustrative purposes the present invention is embodied in the apparatus generally shown in FIG. 1 and FIG. 2, and described with reference also to FIG. 3 and FIG. 4. It will be appreciated that the apparatus may vary as to configuration and as to details of the parts and that the method may vary as to the steps and their sequence without departing from the basic concepts as disclosed herein.

Figure 1:
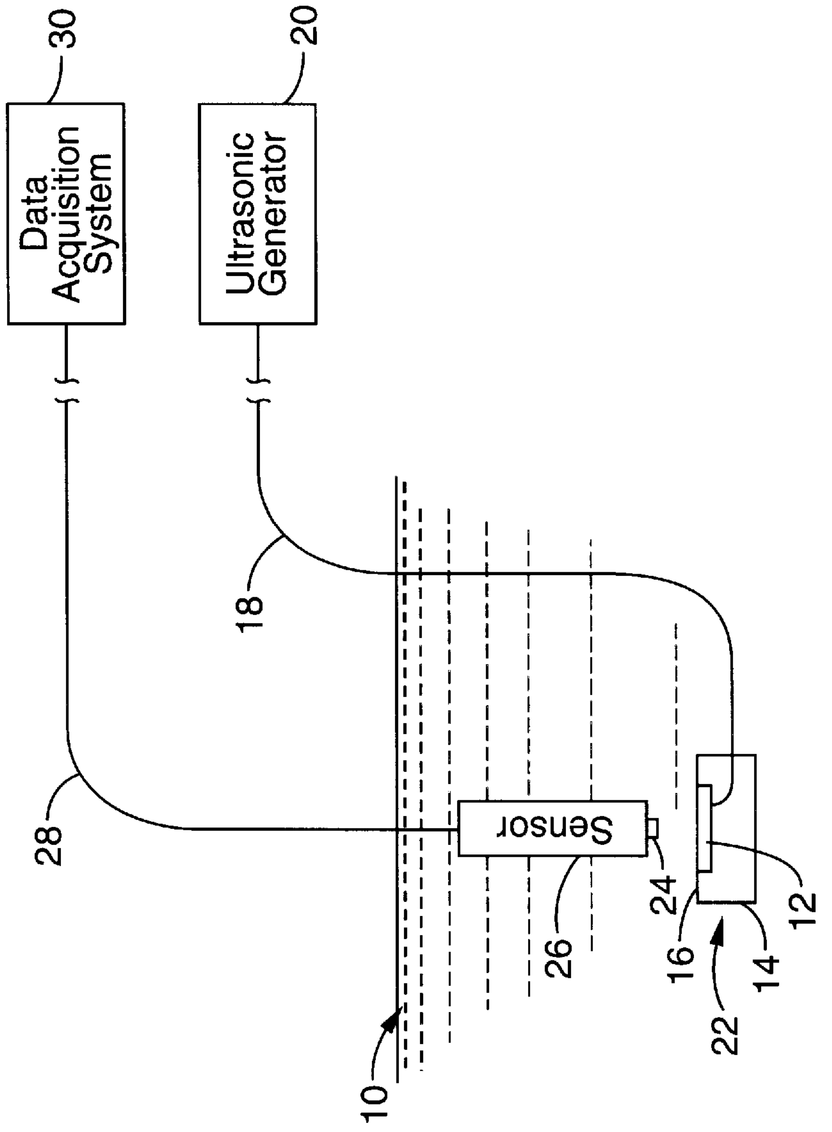
FIG. 1 is a schematic diagram showing the apparatus of the present invention configured as part of a system for cleaning and inhibiting biofouling of a dissolved oxygen probe.

Referring first to FIG. 1, there is shown an aquatic environment 10 of microbiologically active water that contains a substance of interest. Examples of such an aquatic environment include, but are not limited to, an ocean, lake, river, wastewater treatment basin, aquaculture tank, laboratory container or biological reactor. In accordance with the present invention, a transducer 12, which generates ultrasonic pressure waves, is placed in the aquatic environment 10. Transducer 12 is a commercially available transducer that can be readily procured from a variety of manufacturers and is typically made from a piezoelectric material. To protect transducer 12 against damage from the aquatic environment 10, it is housed in an enclosure 14 that separates the transducer from the aquatic environment. Transducer 12 is mechanically attached or otherwise coupled to one of the walls 16 of enclosure 14 to allow for the transmission of ultrasonic energy into the water 10. In addition, transducer 12 is electrically connected by means of a cable 18 or the like to an ultrasonic generator 20 which drives or powers the transducer. Ultrasonic generator 20 is a conventional circuit widely available in industry and is commonly found in ultrasonic jewelry cleaners, printed circuit board cleaning equipment, and ultrasonic medical devices. In addition, for purposes of the present invention, ultrasonic generator 20 further includes conventional timing circuitry to control the duration and frequency to with which it operates.

Transducer 12 and enclosure 14 form a submersible ultrasonic transducer assembly 22 that is positioned in proximity to the membrane covered probe surface 24 of a dissolved oxygen (DO) sensor 26 or other aquatic sensor. The ultrasonic pressure waves emitted from transducer assembly 22 interact with probe surface 24 of sensor 26 to prevent biofouling. It will be appreciated that probe surface 24 comprises the surface of the membrane placed over the electrode of the sensor. The distance between probe surface 24 and the enclosure wall 16 to which transducer 12 is attached can be varied depending on the particulars of the transducer 12 and driving circuit 20. However, a typical separation is on the order of 4 mm to 10 mm for effective ultrasonification of the probe surface.

Sensor 26 is electrically connected by means of a cable 28 or the like to an associated measurement and data acquisition system 30. For sensors such as a polarographic dissolved oxygen sensor which requires a certain amount of water movement past probe surface 24, the entire apparatus can be positioned in the body of water 10 where such water movement past the probe surface 24 can occur.

EXAMPLE 1

At initial setup, the dissolved oxygen sensor 26 or the like is positioned in the body of water 10 such that sufficient water movement and exposure by the ultrasonic pressure waves can occur. Sensor 26 is then subjected to sonification for an initial period of time so as to allow the dissolved oxygen membrane geometry to stabilize. Sonification is then shut off while the standard dissolved oxygen sensor calibration procedure commences. Thereafter, sonification is periodically applied to inhibit biofouling on the probe. It has been found through laboratory tests that sonification for sixty seconds every fifteen minutes is sufficient to inhibit fouling, although sonification for approximately five to ninety seconds at intervals between approximately five and one hundred and twenty minutes should also be sufficient. The laboratory tests were conducted in microbiologically active water designed to promote severe biofouling. In many situations the sonification interval may be reduced (i.e., the ratio of ultrasound "on" time to "off" time can be lowered). During sonification, erratic measurements may be observed with the DO meter. If that occurs, it will be appreciated that the data acquisition software can be configured to ignore the DO measurements during the sonification interval or post processing of the acquired data can be used to filter out the uncharacteristic readings caused by the sonification.

EXAMPLE 2

Figure 2:
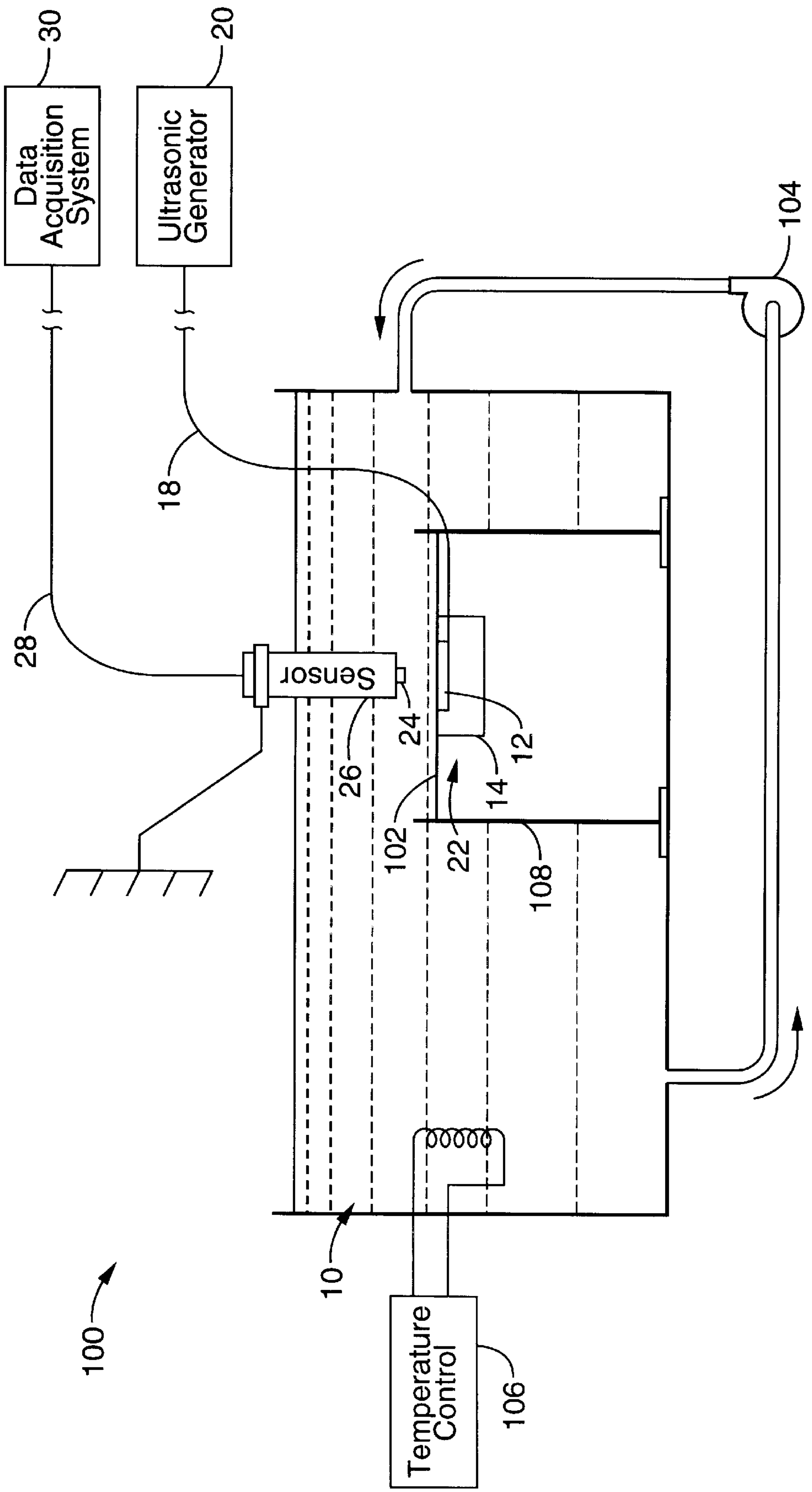
FIG. 2 is a schematic diagram showing the apparatus of the present invention in a test configuration.

Referring to FIG. 2, there is shown a test chamber 100 for testing the present invention wherein piezoelectric transducer 12 is affixed to a thin stainless steel plate 102 and encased in a water impervious housing 14. The transducer assembly 22 is placed into test chamber 100 along with a polarographic dissolved oxygen sensor 26. Transducer 12 is electrically connected to ultrasonic generator 20 for a source of drive energy. The dissolved oxygen sensor 26 is electrically connected to dissolved oxygen meter and data processing and recording instrumentation 30. The test chamber 100 provides water circulation via a pump 104, temperature control 106 for adjusting biofouling activity levels, and support fixtures 108 for positioning transducer 12 and sensor 26.

EXAMPLE 3

A culture of biofouling microorganisms was grown and maintained in test chamber 100. Two identical DO probes were submerged in the test chamber for approximately one week. The first probe was subjected to sonification of the oxygen permeable membrane for sixty seconds every fifteen minutes after an initial sonification and calibration period to stabilize the membrane geometry. The second probe was in the same test chamber and exposed to the same microbiologically active environment; however, it was shielded from the ultrasound effects. After several days (approximately seven days for this particular microbiologically active environment) a substantial layer of biofouling was observed on almost all free surfaces of the test chamber, including the probes. FIG. 3 is a photograph of the oxygen permeable membrane of the first DO probe that was subjected to ultrasonification in accordance with the present invention. FIG. 4 is a photograph of the unsonified oxygen permeable membrane of the second DO probe. Note that the membrane (target surface area) of the probe subjected to sonification was "clean" whereas the unsonified probe exhibited obvious biofouling.

It will be appreciated that the apparatus of the present invention may be embodied in a variety of forms, some of which are listed as follows:

1. Although the development effort was started with the polarographic membrane oxygen sensor, the invention may be used with different types of probes and sensors, such as: pH electrodes, oxidation reduction potential electrodes, ion selective electrodes, gas sensing electrodes, temperature sensors, electrical conductivity sensors, water velocity and flow rate sensors, pressure sensors, etc.
2. The invention may also be used to keep clean a variety of small surfaces not necessarily associated with probes or sensors as described in Item 1 above. Examples of these surfaces may be underwater observation ports, vision-oriented sensing devices like fiber optic lens surfaces, view ports for CCD cameras, turbidimeters, photoreceptor sensing elements, and other transmission surfaces.
3. The invention may be used on probes which are continuously immersed in the test solution; as in a dissolved oxygen probe used for the continuous monitoring of dissolved oxygen concentration in water. Alternatively, the invention may be used in a cleaning and storage flask or vessel for probes which are periodically removed for cleaning, maintenance and calibration; or for probes which are used sporadically.
4. The invention may be used in conjunction with other chemical or physical cleaning methods. Examples of chemical methods are exposure of the probe to a cleaning solution. Examples of physical cleaning methods are the use of brushes or wipers.
5. The operation of the invention may be controlled with electronic circuitry and software that are integrated with the circuitry and software of the probe on which the invention is being used, or the circuitry and software may be in a separate, stand-alone unit.
6. The ultrasonic emitter may be integrated into the probe body, it may be built into a probe shield, it may be part of a flow cell or measuring chamber, or it may be a separate unit.
7. The position of the ultrasonic emitter relative to the probe or surface being cleaned may be varied in regards to the distance, or angle. In addition, the shape and size of the emitter can vary depending on the size of the probe or surface to be exposed to the ultrasonic waves, and how the emitter is to be operated.

Furthermore, the mode of operation of the invention may vary in several ways. For example, the preferred frequency at which the piezoelectric crystal is operated can range from approximately 10 KHz to 100 KHz, and it can either be maintained at a constant level, or it can be varied. Varying the frequency (also called frequency sweep) may result in improved performance of the invention. The length of time that the ultrasonic waves are generated and the ratio between time on and time off for ultrasonic wave generation may vary widely depending on the probe being used and the environment to which the probe is exposed. In extreme fouling-prone cases, the ultrasonic waves may be generated during a large percentage of the time the probe is in the fouling environment. In more benign cases, the ultrasonic waves may be generated during a small percentage of the time the probe is in the fouling environment.

Accordingly, it will be seen that this invention prevents biofouling of DO and other aquatic probes without the use of harsh chemical treatments, harmful biocides, or the alteration of temperature or pH of the water being tested. No foreign chemical or material is introduced into the sample water. In addition, the use of piezoelectric material eliminates the unnecessary complexity of current mechanical and hydraulic cleaning systems and avoids problems such as fouling of cleaning nozzles and the need for additional pumping systems and motorized parts.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A anti-biofouling aquatic sensor apparatus, comprising;

(a) an aquatic sensor having a membrane covered probe surface;

(b) an ultrasonic transducer positioned adjacent said aquatic sensor; and (c) means for activating said ultrasonic transducer for a time period of approximately five seconds to ninety seconds at intervals from approximately five minutes to one hundred and twenty minutes so as to emit ultrasonic waves toward said membrane covered probe surface at a frequency from about 10 KHz to about 100 KHz.

2. An apparatus as recited in claim 1, wherein said ultrasonic transducer is enclosed in a water impervious housing.

3. A anti-biofouling aquatic sensor apparatus, comprising:

(a) an aquatic sensor having a membrane covered probe surface wherein said membrane is permeable to a substance to be sensed;

(b) an ultrasonic transducer positioned adjacent said membrane covered probe surface; and (c) means for activating said ultrasonic transducer for a time period of approximately five seconds to ninety seconds at intervals from approximately five minutes to one hundred and twenty minutes so as to emit ultrasonic waves toward said membrane covered probe surface at a frequency from about 10 KHz to about 100 KHz.

4. An apparatus as recited in claim 3, wherein said ultrasonic transducer is enclosed in a water impervious housing.

5. A anti-biofouling aquatic sensor apparatus, comprising:

(a) an aquatic sensor having a membrane covered probe surface wherein said membrane is permeable to a substance to be sensed;

(b) an ultrasonic transducer, said transducer enclosed in a water impervious housing, said transducer positioned adjacent said membrane covered probe surface; and (c) means for activating said ultrasonic transducer for a time period of approximately five seconds to ninety seconds at intervals from approximately five minutes to one hundred and twenty minutes so as to emit ultrasonic waves toward said membrane covered probe surface at a frequency from about 10 KHz to about 100 KHz;

(d) wherein ultrasonic emissions from said ultrasonic transducer inhibit biofouling of said membrane covered probe surface.

6. A method for inhibiting biofouling of aquatic sensors, comprising the steps of:

(a) positioning an ultrasonic transducer adjacent an aquatic sensor;

(b) activating said ultrasonic transducer wherein ultrasonic waves emitted from said transducer inhibit biofouling of said sensor; and (c) emitting said ultrasonic waves for a time period of approximately five seconds to ninety seconds at intervals from approximately five minutes to one hundred and twenty minutes at a frequency from about 10 KHz to about 100 KHz.

7. A method for inhibiting biofouling of aquatic sensors, comprising the steps of:

(a) positioning an ultrasonic transducer adjacent an aquatic sensor having a membrane covered probe surface wherein said membrane is permeable to a substance to be sensed;

(b) activating said ultrasonic transducer so as to emit ultrasonic waves toward said membrane covered probe surface, wherein said ultrasonic waves inhibit biofouling of said sensor; and (c) emitting said ultrasonic waves for a time period of approximately five seconds to ninety seconds at intervals from approximately five minutes to one hundred and twenty minutes at a frequency from about 10 KHz to about 100 KHz.

8. A method for inhibiting biofouling of aquatic sensors, comprising the steps of:

(a) positioning an ultrasonic transducer adjacent an aquatic sensor having a membrane covered probe surface wherein said membrane is permeable to a substance to be sensed;

(b) activating said ultrasonic transducer for an initial time period to permit the geometry of said membrane to stabilize; and (c) activating said ultrasonic transducer for a time period of approximately five seconds to ninety seconds at intervals from approximately five minutes to one hundred and twenty minutes so as to emit ultrasonic waves toward said membrane covered probe surface at a frequency from about 10 KHz to about 100 KHz.

* * * * *